UNITED STATES PATENT OFFICE.

GUSTAV A. LIEBIG AND JOHN F. GIBBONS, OF BALTIMORE, MARYLAND.

TREATING PHOSPHATES FOR FERTILIZERS.

SPECIFICATION forming part of Letters Patent No. 302,266, dated July 22, 1884.

Application filed November 29, 1883. (No specimens.)

*To all whom it may concern:*

Be it known that we, GUSTAV A. LIEBIG and JOHN F. GIBBONS, of the city of Baltimore and State of Maryland, have invented a new and useful method of treating phosphates or phosphorites containing iron or alumina in considerable quantities, for the purpose of converting these phosphorites into a complete commercial fertilizer, and also a new product for fertilizing purposes, of which the following is a full and exact description.

Our invention relates to the same class of phosphorites for which we have an application for a patent now pending, and includes, in part, the method described therein, with additions thereto, which we will proceed to describe. There are two classes of these phosphates to which our invention especially relates, viz: first, those phosphates or phosphorites which contain lime with iron or alumina, or both, in considerable quantities, and also free oxide of iron; second, those phosphates or phosphorites which contain iron or alumina, or both, in considerable quantities without the free oxides, and without lime or with traces only of lime.

Our invention consists in the use of diluted sulphuric acid, diluted as hereinafter described, in conjunction with other chemicals, to absorb the excess of water in the mixture and form new compounds thereof after the acid has been applied. The first class of these phosphates we prefer to have calcined before applying the acid and other chemicals, in order that the free oxides of iron in the phosphorite may become insoluble, or nearly so, and thus confine the action of the dilute acid to the phosphates—viz., of lime, iron, and alumina. The calcining of the phosphorites of this class may be done by simply burning or roasting them alone, and without mixing them with carbonaceous matter or other substance to prepare them for the action of the acid.

The commercial sulphuric acid, as known in our market, varies in strength from 47° to 66° Baumé. Such acid acts more or less upon the free oxides in the phosphorite and forms a sticky, gummy mass, requiring months to dry. To remedy this we employ acid diluted to between 32° and 47°, according to the amount of water contained in the phosphorite—that is to say, if it be wet, we use the acid, say, at 47°, because the water therein will dilute the acid to the required strength. If it be dry, then about 32° will be sufficient to accomplish the purpose. The dilute acid may be applied either hot or cold. This treatment is made the basis of another application, for which in due time I will receive Letters Patent, and forms the subject-matter of that application—viz., the making of a commercial superphosphate from these phosphates of iron and alumina.

In order to make a complete fertilizer and absorb more rapidly any excess of water present in the mixture, we form additional chemical compounds by employing the salts (preferably the sulphates) of ammonia or potash, or both, which may be mixed with the dilute acid or applied directly to the phosphate before or after the application of the acid. Solutions of either of these salts will also answer the purpose.

If we desire to make an ammoniated superphosphate, we employ sulphate of ammonia. If a plain superphosphate is desired, we use the sulphate or muriate of potash. The exact proportion of either depends upon the grade of the fertilizer sought to be obtained. If of a high grade, more is requisite; if a low one, less, varying from fifty to five hundred pounds of the sulphates per ton of the fertilizer, and when thus mixed and prepared the article contains a new compound—viz., soluble and available phosphate of iron, soluble and available phosphate of ammonia, and alum, and the alum in its turn, according to the sulphate used, is either sulphate of alumina and sulphate of potash, or sulphate of alumina and sulphate of ammonia.

The action of the acid upon the phosphorite produces sulphate of iron or alumina, or both, which, in conjunction with these salts of ammonia or potash, forms a double salt, (commonly called alumina and potash alums.) This, by its subsequent crystallization, takes up the water present in the mixture as water of crystallization, dries the mass rapidly, and presents a complete fertilizer in a salable form, in unexceptionable mechanical condition, and in much less than the usual time. By this method the fertilizer is prepared in perfect condition for the market direct from the crude or calcined phosphorite and without intermediate process.

We cannot state the exact proportions of the acid and other chemicals used in our process, or the grade of the fertilizer which may be desired, as these will vary somewhat with the character of the phosphorite to be treated.

What we claim, and desire to secure by Letters Patent, is—

1. The above-described method of converting mineral phosphates containing iron or alumina in quantity into complete commercial fertilizers, by treating said phosphates with dilute acid of the specific gravity above described, and then adding to same the salts of ammonia or potash, substantially in the manner shown, and for the purposes set forth.

2. The product obtained by the above-described process—viz., a fertilizer consisting of soluble and available phosphate of iron, soluble and available phosphate of alumina, and alum, substantially as described.

GUSTAV A. LIEBIG.
JOHN F. GIBBONS.

Witnesses:
W. S. WILKINSON,
S. J. WILKINSON.